(12) United States Patent
Zhu

(10) Patent No.: US 11,765,662 B2
(45) Date of Patent: *Sep. 19, 2023

(54) PHYSICAL DOWNLINK CONTROL SIGNALING DETECTION METHOD, DEVICE, AND COMPUTER READABLE STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,527

(22) Filed: Oct. 25, 2022

(65) Prior Publication Data

US 2023/0049208 A1 Feb. 16, 2023

Related U.S. Application Data

(63) Continuation of application No. 17/055,116, filed on Nov. 12, 2020, now Pat. No. 11,516,740, which is a
(Continued)

(51) Int. Cl.
*H04W 52/02* (2009.01)
*H04W 80/02* (2009.01)

(52) U.S. Cl.
CPC ... *H04W 52/0235* (2013.01); *H04W 52/0216* (2013.01); *H04W 80/02* (2013.01)

(58) Field of Classification Search
CPC ........ H04W 52/0235; H04W 52/0216; H04W 52/0229; H04W 52/0225; H04W 80/02;
(Continued)

(56) References Cited

U.S. PATENT DOCUMENTS

| 9,755,804 B2 | 9/2017 | Kang et al. |
| 2014/0133346 A1 | 5/2014 | Kang et al. |

(Continued)

FOREIGN PATENT DOCUMENTS

| CN | 103096438 A | 5/2013 |
| CN | 104244380 A | 12/2014 |

(Continued)

OTHER PUBLICATIONS

International Search Report of PCT Application No. PCT/CN2018/089296 dated Dec. 6, 2018 with English translation, (4p).
(Continued)

*Primary Examiner* — Jianye Wu
(74) *Attorney, Agent, or Firm* — Arch & Lake LLP

(57) ABSTRACT

The present disclosure relates to a physical downlink control signaling detection method, a device, and a computer readable storage medium, pertaining to the technical field of communications. The method comprises: determining a transmission position of wake-up signaling; and receiving, according to the transmission position of the wake-up signaling, the wake-up signaling transmitted by a base station, the wake-up signaling indicating whether a terminal is to detect physical downlink control signaling within a predetermined time window.

18 Claims, 14 Drawing Sheets

Related U.S. Application Data continuation of application No. PCT/CN2018/089296, filed on May 31, 2018.

(58) Field of Classification Search
CPC ... H04L 5/0053; H04L 5/0078; H04L 5/0094; Y02D 30/70
See application file for complete search history.

(56) References Cited

U.S. PATENT DOCUMENTS

| | | | |
|---|---|---|---|
| 2018/0097598 | A1 | 4/2018 | Ang |
| 2018/0332533 | A1 | 11/2018 | Bhattad et al. |
| 2020/0029302 | A1* | 1/2020 | Cox ................ H04W 56/0015 |
| 2020/0145921 | A1* | 5/2020 | Zhang ............... H04W 52/0229 |

FOREIGN PATENT DOCUMENTS

| | | |
|---|---|---|
| CN | 107735975 A | 2/2018 |
| CN | 107820721 A | 3/2018 |
| CN | 108012312 A | 5/2018 |
| CN | 110958622 A | 4/2020 |
| WO | 2012149322 A1 | 11/2012 |
| WO | 2018017008 A1 | 1/2018 |

OTHER PUBLICATIONS

First Office Action of the Chinese Application No. 201880000483.1, dated Apr. 24, 2020 with English translation, (14p).

Second Office Action of the Chinese Application No. 201880000483.1, dated Nov. 16, 2020 and English translation, (7p).

LG Electronics, "Discussion on wake up signal configurations and procedures in NB-IoT", 3GPP TSG RAN WG1 Meeting #93, R1-1806589, Busan, Korea, May 21-25, 2018, (9p).

Intel Corporation, "Powersaving signal for efeMTC", 3GPP TSG RAN WG1 Meeting #93, R1-1806489, Busan, Korea dated May 21-25, 2018, (11p).

Huawei, HiSilicon, "On wake-up signal for eFeMTC", 3GPP TSG RAN WG1 Meeting #93, R1-1805979, Busan, Korea dated May 21-25, 2018, (5p).

Notice of Grant issued to Chinese Application No. 201880000483.1 dated May 6, 2021 with English translation, (3p).

Mediatek Inc: "WUS time configuration", R2-1807744, 3rd Generation Partnership Project (3GPP), Mobile Competence Centre ; 650, Route Des Lucioles; F-06921 Sophia-Antipolis Cedex; France, vol. RAN WG2, No. Busan, Korea; May 21, 2018-May 25, 2018 May 20, 2018, (5 pages).

Qualcomm Incorporated: "Efficient monitoring of DL control channels", R1-1804914, 3rd Generation Partnership Project (3GPP), Mobile Competence Centre ; 650,Route Des Lucioies • F-06921 Sophia-Antipolis Cedex FRA, vol. RAN WG1, No. Sanya, China; Apr. 16, 2018-Apr. 20, 2018 Apr. 15, 2018, (13p).

Extended European Search Report in the European Application No. 18920470.4, dated Jan. 21, 2022, (12 pages).

Non-Final Office Action of U.S. Appl. No. 17/055,116 dated Apr. 4, 2022, (26p).

* cited by examiner

PHYSICAL DOWNLINK CONTROL SIGNALING DETECTION METHOD, DEVICE, AND COMPUTER READABLE STORAGE MEDIUM

CROSS REFERENCE TO RELATED APPLICATIONS

The present application is a continuation application of U.S. patent application Ser. No. 17/055,116 filed on Nov. 12, 2020, which is filed upon and claims priority to the international PCT Application No. PCT/CN2018/089296 filed on May 31, 2018, contents of which are incorporated herein by reference in their entireties for all purposes.

TECHNICAL FIELD

The present disclosure generally relates to the technical field of communications, and more particularly, to a physical downlink control signaling detection method and device, and a computer-readable storage medium.

BACKGROUND

In a long term evolution (LTE) network, a base station is responsible for scheduling uplink and downlink transmission resources. The base station indicates a position of a resource for data transmission of a terminal through a scheduling instruction, and a piece of scheduling signaling indicates positions of resources in one or more transmission units (for example, subframes) for the terminal. Correspondingly, the terminal monitors a physical downlink control channel (PDCCH) to acquire the scheduling signaling sent by the base station.

Since energy consumption for PDCCH monitoring is high, keeping monitoring the PDCCH of the base station may waste a lot of electric energy of the terminal. Therefore, there is a discontinuous reception (DRX) technology through which the terminal may periodically enter a sleep state and the terminal does not need to monitor the PDCCH in a sleep period. When a sleep period ends, the terminal may monitor the PDCCH in a period of time to determine whether it needs to be switched from the sleep state to an active state.

However, in the technical solution, monitoring the PDCCH in a period of time may still waste electric energy.

SUMMARY

The present disclosure provides a physical downlink control signaling detection method and device, and a computer-readable storage medium, to reduce energy consumption for physical downlink control signaling detection and implement power saving of a terminal.

According to a first aspect of embodiments of the present disclosure, a physical downlink control signaling detection method is provided, which may include: a wakeup signaling transmission position is determined; and wakeup signaling sent by a base station is determined according to the wakeup signaling transmission position, the wakeup signaling being configured to instruct a terminal whether to perform physical downlink control signaling detection in a predetermined time window.

In an implementation mode of the present disclosure, the operation that the wakeup signaling transmission position is determined may include: the wakeup signaling transmission position is acquired according to a predefined configuration parameter, the predefined configuration parameter including the wakeup signaling transmission position; or, the operation that the wakeup signaling transmission position is determined may include: detection configuration information sent by the base station is received, the detection configuration information including the wakeup signaling transmission position.

In the implementation mode, two methods adopted by the terminal to determine the wakeup signaling transmission position are provided. One is determination according to the predefined configuration parameter, for example, configuration in a transmission protocol, and in this manner, the transmission position may be simply acquired without interaction with the base station. The other is that the base station sends the detection configuration information including the wakeup signaling transmission position to the terminal. In the implementation mode, the base station may flexibly configure the wakeup signaling transmission position as required.

In another implementation mode of the present disclosure, the operation that the detection configuration information sent by the base station is received may include: radio resource control signaling, media access control (MAC)-layer signaling or physical-layer signaling including the detection configuration information sent by the base station is received.

In the implementation mode, the detection configuration information may be sent through the radio resource control signaling, the MAC-layer signaling or the physical-layer signaling, and may be sent by use of existing signaling or new signaling.

In another implementation mode of the present disclosure, in response to the wakeup signaling configured to instruct the terminal to perform the physical downlink control signaling detection in the predetermined time window, the method may further include: a detection moment for performing the physical downlink control signaling detection in the predetermined time window is acquired; and the physical downlink control signaling detection is executed at the detection moment.

In the implementation mode, in response to the physical downlink control signaling detection needing to be performed, the detection moment for performing the physical downlink control signaling detection is determined at first, and then the physical downlink control signaling detection is executed at the detection moment, such that the accuracy of the physical downlink control signaling detection is ensured.

In another implementation mode of the present disclosure, the operation that the detection moment for performing the physical downlink control signaling detection in the predetermined time window is acquired may include: the detection moment is acquired according to a first predefined detection parameter, the first predefined detection parameter including the detection moment; or, the operation that the detection moment for performing the physical downlink control signaling detection in the predetermined time window is acquired may include: first configuration signaling is acquired, the first configuration signaling including the detection moment, and the detection moment is acquired from the first configuration signaling.

In the implementation mode, two methods adopted by the terminal to determine the detection moment are provided. One is determination according to the predefined detection parameter, for example, configuration in the transmission protocol, and in this manner, the detection moment may be simply acquired without interaction with the base station. The other is including the detection moment in the first configuration signaling. In the implementation mode, the base station may flexibly configure the detection moment as required.

In another implementation mode of the present disclosure, the operation that the physical downlink control signaling detection is executed at the detection moment may include: detection parameter information is acquired, the detection parameter information including at least one of a detection number, a control signaling format to be detected or an aggregation level; and the physical downlink control signaling detection is performed at the detection moment according to the detection parameter information.

In the implementation mode, in response to the physical downlink control signaling detection needing to be performed, the detection parameter information, such as the detection number, the control signaling format to be detected and the aggregation level, is determined at first, and then the physical downlink control signaling detection is executed according to the detection parameter information.

In another implementation mode of the present disclosure, the operation that the detection parameter information is acquired may include: the detection parameter information is acquired according to a second predefined detection parameter, the second predefined detection parameter including the detection parameter information; or, the operation that the detection parameter information is acquired may include: second configuration signaling is acquired, the second configuration signaling including the detection parameter information, and the detection parameter information is acquired from the second configuration signaling. Or, the operation that the detection parameter information is acquired may include: the second configuration signaling is acquired, the second configuration signaling including parameter indication information, the parameter indication information is acquired from the second configuration signaling, and the detection parameter information corresponding to the parameter indication information in the second configuration signaling is acquired according to a corresponding relationship between the parameter indication information and the detection parameter information. Or, the operation that the detection parameter information is acquired may include: the second configuration signaling is acquired, the second configuration signaling including modification information and the modification information being configured to indicate a part of the detection parameter information to be used which is different from detection parameter information in a predefined detection parameter, the modification information is acquired from the second configuration signaling, and the detection parameter information is obtained according to the predefined detection parameter and the modification information.

In the implementation mode, multiple methods adopted by the terminal to determine the detection parameter information are provided. For example, the detection parameter information is determined according to the predefined detection parameter, for example, configured in the transmission protocol, and in this manner, the detection parameter information may be simply acquired without interaction with the base station. For another example, the detection parameter information, the parameter indication information or the modification information is included in the second configuration signaling. In the implementation mode, the base station may flexibly configure the detection parameter information as required.

According to a second aspect of embodiments of the present disclosure, a physical downlink control signaling detection method is provided, which may include: a wakeup signaling transmission position is determined; wakeup signaling is sent to a terminal according to the wakeup signaling transmission position, the wakeup signaling being configured to instruct the terminal whether to perform physical downlink control signaling detection in a predetermined time window.

In an implementation mode of the present disclosure, the method may further include: detection configuration information is sent to the terminal, the detection configuration information including the wakeup signaling transmission position.

In another implementation mode of the present disclosure, the operation that the detection configuration information is sent to the terminal may include: radio resource control signaling, MAC-layer signaling or physical-layer signaling including the detection configuration information is sent to the terminal.

In another implementation mode of the present disclosure, the method may further include: first configuration signaling is sent to the terminal, the first configuration signaling including a detection moment for physical downlink control signaling detection of the terminal in the predetermined time window.

In another implementation mode of the present disclosure, the method may further include: second configuration signaling is sent to the terminal, the second configuration signaling including detection parameter information for physical downlink control signaling detection of the terminal and the detection parameter information including at least one of a detection number, a control signaling format to be detected or an aggregation level; or, the second configuration signaling including parameter indication information and the parameter indication information corresponding to the detection parameter information; or, the second configuration signaling including modification information and the modification information being configured to indicate a part of the detection parameter information to be used by the terminal which is different from detection parameter information in a predefined detection parameter.

According to a third aspect of embodiments of the present disclosure, a physical downlink control signaling detection device is provided, which may include: a determination unit, configured to determine a wakeup signaling transmission position; and a receiving unit, configured to receive wakeup signaling sent by a base station according to the wakeup signaling transmission position, the wakeup signaling being configured to instruct a terminal whether to perform physical downlink control signaling detection in a predetermined time window.

In an implementation mode of the present disclosure, the determination unit may be configured to acquire the wakeup signaling transmission position according to a predefined configuration parameter, the predefined configuration parameter including the wakeup signaling transmission position. Or, the receiving unit may further be configured to receive detection configuration information sent by the base station, the detection configuration information including the wakeup signaling transmission position, and the determination unit may be configured to acquire the wakeup signaling transmission position according to the detection configuration information.

In another implementation mode of the present disclosure, the receiving unit may be configured to receive radio resource control signaling, MAC-layer signaling or physical-layer signaling including the detection configuration information from the base station.

In another implementation mode of the present disclosure, in response to the wakeup signaling configured to instruct the terminal to perform the physical downlink control signaling detection in the predetermined time window, the determination unit may further be configured to acquire a detection moment for performing the physical downlink control signaling detection in the predetermined time window; and the device may further include a detection unit, configured to execute the physical downlink control signaling detection at the detection moment.

In another implementation mode of the present disclosure, the determination unit may be configured to acquire the detection moment according to a first predefined detection parameter, the first predefined detection parameter including the detection moment; or, the determination unit may be configured to acquire first configuration signaling, the first configuration signaling including the detection moment, and acquire the detection moment from the first configuration signaling.

In another implementation mode of the present disclosure, the determination unit may further be configured to acquire detection parameter information, the detection parameter information including at least one of a detection number, a control signaling format to be detected or an aggregation level; and the detection unit may be configured to perform the physical downlink control signaling detection at the detection moment according to the detection parameter information.

In another implementation mode of the present disclosure, the determination unit may be configured to acquire the detection parameter information according to a second predefined detection parameter, the second predefined detection parameter including the detection parameter information; or, the determination unit may be configured to acquire second configuration signaling, the second configuration signaling including the detection parameter information, and acquire the detection parameter information from the second configuration signaling; or, the determination unit may be configured to acquire the second configuration signaling, the second configuration signaling including parameter indication information, acquire the parameter indication information from the second configuration signaling and acquire the detection parameter information corresponding to the parameter indication information in the second configuration signaling according to a corresponding relationship between the parameter indication information and the detection parameter information; or, the determination unit may be configured to acquire the second configuration signaling, the second configuration signaling including modification information and the modification information being configured to indicate a part of the detection parameter information to be used which is different from detection parameter information in a predefined detection parameter, acquire the modification information from the second configuration signaling and obtain the detection parameter information according to the predefined detection parameter and the modification information.

According to a fourth aspect of embodiments of the present disclosure, a physical downlink control signaling detection device is provided, characterized in that the device may include: a determination unit, configured to determine a wakeup signaling transmission position; and a sending unit, configured to send wakeup signaling to a terminal according to the wakeup signaling transmission position, the wakeup signaling being configured to instruct the terminal whether to perform physical downlink control signaling detection in a predetermined time window.

In an implementation mode of the present disclosure, the sending unit may further be configured to send detection configuration information to the terminal, the detection configuration information including the wakeup signaling transmission position.

In another implementation mode of the present disclosure, the sending unit may be configured to send radio resource control signaling, MAC-layer signaling or physical-layer signaling including the detection configuration information to the terminal.

In another implementation mode of the present disclosure, the sending unit may further be configured to send first configuration signaling to the terminal, the first configuration signaling including a detection moment for physical downlink control signaling detection of the terminal in the predetermined time window.

In another implementation mode of the present disclosure, the sending unit may further be configured to send second configuration signaling to the terminal, the second configuration signaling including detection parameter information for physical downlink control signaling detection of the terminal and the detection parameter information including at least one of a detection number, a control signaling format to be detected or an aggregation level; or, the second configuration signaling including parameter indication information and the parameter indication information corresponding to the detection parameter information; or, the second configuration signaling including modification information and the modification information being configured to indicate a part of the detection parameter information to be used by the terminal which is different from detection parameter information in a predefined detection parameter.

According to a fifth aspect of embodiments of the present disclosure, a physical downlink control signaling detection device is provided, which may include a processor and a memory configured to store instructions executable by the processor. The processor may be configured to execute the physical downlink control signaling detection method in the first aspect.

According to a sixth aspect of embodiments of the present disclosure, a physical downlink control signaling detection device is provided, which may include a processor and a memory configured to store instructions executable by the processor. The processor may be configured to execute the physical downlink control signaling detection method in the second aspect.

According to a seventh aspect of embodiments of the present disclosure, a computer-readable storage medium is provided, instructions in the computer-readable storage medium being executed by a processor of a physical downlink control signaling detection device to cause the physical downlink control signaling detection device to execute the physical downlink control signaling detection method in the first aspect.

According to an eighth aspect of embodiments of the present disclosure, a computer-readable storage medium is provided, instructions in the computer-readable storage medium being executed by a processor of a physical downlink control signaling detection device to cause the physical downlink control signaling detection device to execute the physical downlink control signaling detection method in the second aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure.

For conveniently understanding the technical solutions provided in the embodiments of the present disclosure, a physical downlink control signaling detection technology will be introduced and described at first below.

The following three application scenarios are defined in a 5th-generation (5G) technology: an enhanced mobile broad band (eMBB) scenario, a massive machine type communication (mMTC) scenario and an ultra reliable low latency communication (URLLC) scenario. Different application scenarios have different wireless communication requirements. For ensuring that a wireless communication solution may meet requirements of different application scenarios, it is necessary to implement flexible configuration of transmission resources in a network.

Figure 1:
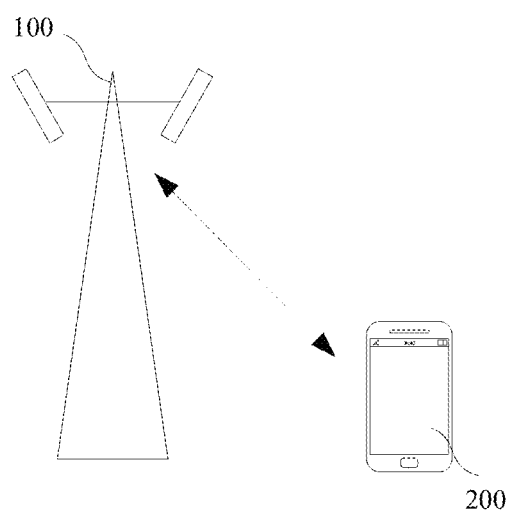
FIG. 1 is a schematic diagram illustrating a network architecture, according to an embodiment of the present disclosure.

At present, flexible configuration of transmission resources is implemented by resource scheduling. Resource scheduling will be described below with an LTE network as an example. FIG. 1 is a schematic diagram illustrating a network architecture, according to an embodiment of the present disclosure. Referring to FIG. 1, a base station 100 is responsible for scheduling uplink and downlink transmission resources. The base station 100 indicates a position of a resource for data transmission of a terminal 200 through a scheduling instruction, and a piece of scheduling signaling indicates positions of resources in one or more transmission units (for example, subframes) for the terminal.

Figure 2:
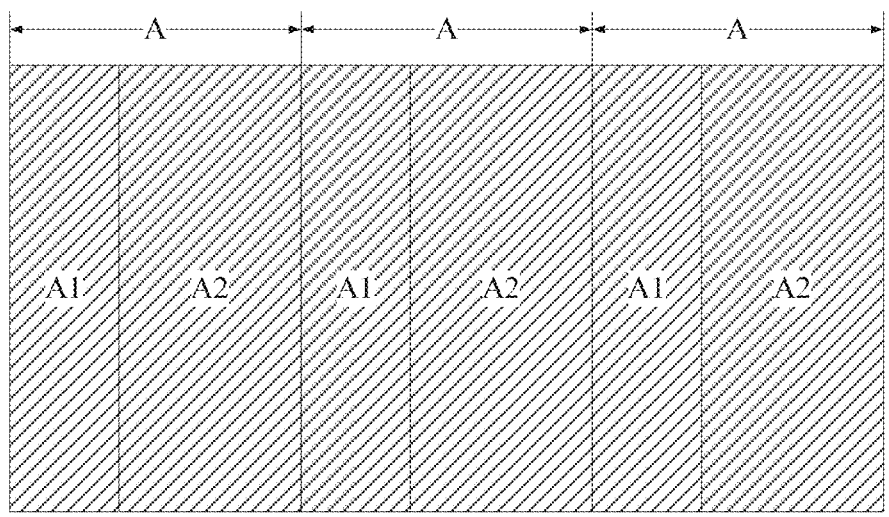
FIG. 2 is a schematic diagram illustrating dynamic scheduling of LTE.

FIG. 2 is a schematic diagram illustrating dynamic scheduling of LTE. Referring to FIG. 2, a subframe A may be divided into two parts, i.e., a downlink control region A1 and a downlink data region A2. A terminal monitors a PDCCH in the downlink control region A1 to acquire physical downlink control signaling (for example, scheduling signaling) sent by a base station, and determines a position of an allocated transmission resource in the downlink data region A2 according to the scheduling signaling.

Figure 3:
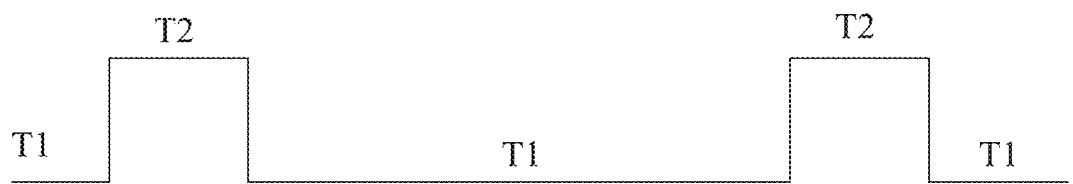
FIG. 3 is a schematic diagram illustrating a DRX solution.

Since energy consumption for PDCCH monitoring is high, keeping monitoring a PDCCH of a base station may waste a lot of electric energy of a terminal. Therefore, there is a DRX technology. FIG. 3 is a schematic diagram illustrating a DRX solution. Referring to FIG. 3, the terminal periodically enters a sleep state, and the terminal does not need to monitor the PDCCH in a sleep period T1. When a sleep period ends, the terminal may monitor the PDCCH in a period of time T2 to determine whether it needs to be switched from the sleep state to an active state.

However, in the technical solution, monitoring the PDCCH in a period of time may still waste electric energy.

For solving the problem that monitoring a PDCCH in a period of time may still waste electric energy, embodiments of the present disclosure provide a physical downlink control signaling detection method and device, and a computer-readable storage medium. Details refer to the following embodiments.

Figure 4:
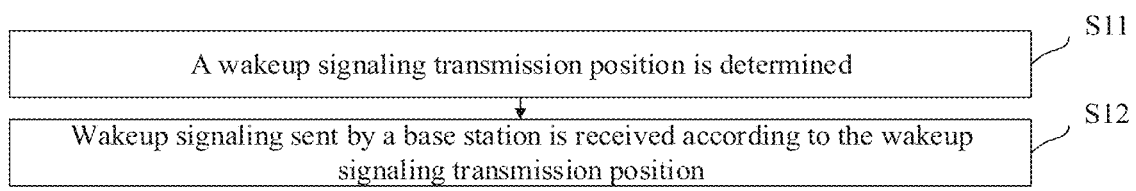
FIG. 4 is a flow chart showing a physical downlink control signaling detection method, according to an embodiment.

FIG. 4 is a flow chart showing a physical downlink control signaling detection method, according to an embodiment. The method may be executed by a terminal. Referring to FIG. 4, the physical downlink control signaling detection method includes the following steps.

In S11, a wakeup signaling transmission position is determined.

The wakeup signaling transmission position includes a time-domain position, may be a position of a transmission unit, for example, a serial number of the transmission unit, or may be before a certain transmission unit, or may be an offset value relative to a certain transmission unit. The transmission unit may be a frame, a subframe, a slot and a symbol.

In some embodiments, the wakeup signaling transmission position may also include at least one of frequency-domain position or space-domain position. The frequency-domain and/or space-domain position is an optional content. For example, part of frequency-domain resources in a carrier may be indicated in the transmission position to cause the terminal to perform detection on the part of frequency-domain resources in the carrier to avoid detecting the wakeup signaling in all frequency bands.

In S12, wakeup signaling sent by a base station is received according to the wakeup signaling transmission position, and the wakeup signaling is configured to instruct the terminal whether to perform physical downlink control signaling detection in a predetermined time window.

The predetermined time window includes, but is not limited to, one transmission unit, two transmission units or multiple transmission units after the wakeup signaling transmission position.

The wakeup signaling may be sent through radio resource control signaling, MAC-layer signaling or physical-layer signaling. The wakeup signaling may usually be sent through the physical-layer signaling, for example, physical downlink control signaling.

In the embodiments of the present disclosure, the terminal determines whether the physical downlink control signaling detection needs to be performed in the predetermined time window through the wakeup signaling sent by the base station, it does not need to continuously perform the physical downlink control signaling detection, such that power is saved, and the energy consumption is reduced. The wakeup signaling is received at a specified transmission position and also does not need to be continuously monitored, such that it is ensured that the energy consumption in the whole process is relatively low.

In some embodiments, the operation that the wakeup signaling transmission position is determined includes: the wakeup signaling transmission position is acquired according to a predefined configuration parameter, and the predefined configuration parameter includes the wakeup signaling transmission position. Or, the operation that the wakeup signaling transmission position is determined includes: detection configuration information sent by the base station is received, and the detection configuration information includes the wakeup signaling transmission position.

In the implementation mode, two methods adopted by the terminal to determine the wakeup signaling transmission position are provided. One is determination according to the predefined configuration parameter, for example, configuration in a transmission protocol, and in this manner, the transmission position may be simply acquired without interaction with the base station. The other is that the base station sends the detection configuration information including the wakeup signaling transmission position to the terminal. In the implementation mode, the base station may flexibly configure the wakeup signaling transmission position as required.

In some embodiments, the operation that the detection configuration information sent by the base station is received includes: radio resource control signaling, MAC-layer signaling or physical-layer signaling including the detection configuration information sent by the base station is received.

In the implementation mode, the detection configuration information may be sent through the radio resource control signaling, the MAC-layer signaling or the physical-layer signaling, and may be sent by use of existing signaling or new signaling. For example, the MAC-layer signaling may specifically be a control element (CE) field in a MAC-layer protocol data unit (PDU).

In some embodiments, the operation that the wakeup signaling sent by the base station is received according to the wakeup signaling transmission position includes: a detection parameter for the wakeup signaling is determined, the detection parameter for the wakeup signaling including at least one of a detection number, a control signaling format to be detected or an aggregation level; and the wakeup signaling is detected at the wakeup signaling transmission position according to detection parameter information for the wakeup signaling.

The detection number is a detection number of the terminal on a transmission unit. For example, the terminal executes detection for 10 times on a symbol. The control signaling format to be detected refers to a wakeup signaling format to be detected. For example, the terminal only detects wakeup signaling in downlink control signaling formats 1 and 2 on a symbol. The aggregation level may be 1/2/4/8 or higher, and different aggregation levels correspond to the number of resources occupied by transmission of a piece of wakeup signaling.

In some embodiments, the detection parameter for the wakeup signaling may also be obtained in two manners of acquisition from a pre-configuration and signaling transmission. In an implementation mode, the detection parameter for the wakeup signaling and the wakeup signaling transmission position may be set in the same pre-configuration, for example, the predefined configuration parameter further includes the detection parameter for the wakeup signaling; or, the detection parameter for the wakeup signaling and the wakeup signaling transmission position may be sent through same signaling, for example, the detection configuration information further includes the detection parameter for the wakeup signaling. In another implementation mode, the detection parameter for the wakeup signaling and the wakeup signaling transmission position may also be sent through different signaling.

In some embodiments, when the wakeup signaling is configured to instruct the terminal to perform the physical downlink control signaling detection in the predetermined time window, the method further includes: a detection moment for performing the physical downlink control signaling detection in the predetermined time window is acquired; and the physical downlink control signaling detection is executed at the detection moment.

In the implementation mode, when the physical downlink control signaling detection needs to be performed, the detection moment for performing the physical downlink control signaling detection is determined at first, and then the physical downlink control signaling detection is executed at the detection moment, such that the accuracy of the physical downlink control signaling detection is ensured.

In some embodiments, the operation that the detection moment for performing the physical downlink control signaling detection in the predetermined time window is acquired includes: the detection moment is acquired according to a first predefined detection parameter, and the first predefined detection parameter includes the detection moment; or, the operation that the detection moment for performing the physical downlink control signaling detection in the predetermined time window is acquired includes: first configuration signaling is acquired, the first configuration signaling includes the detection moment, and the detection moment is acquired from the first configuration signaling.

The detection moment specifically refers to a time-domain position. The first predefined detection parameter or the first configuration signaling may further include a frequency-domain or space-domain position for the physical downlink control signaling detection, such that the terminal performs the physical downlink control signaling detection.

In the implementation mode, two methods adopted by the terminal to determine the detection moment are provided. One is determination according to the predefined detection parameter, for example, configuration in the transmission protocol, and in this manner, the detection moment may be simply acquired without interaction with the base station. The other is including the detection moment in the first configuration signaling. In the implementation mode, the base station may flexibly configure the detection moment as required.

The first configuration signaling may be the abovementioned wakeup signaling, such that the signaling overhead is reduced. In another implementation mode, the first configuration signaling may also be independent signaling, and in such case, the first configuration signaling is sent prior to the wakeup signaling and may be implemented through radio resource control signaling, MAC-layer signaling or physical-layer signaling.

In some embodiments, the operation that the physical downlink control signaling detection is executed at the detection moment includes: detection parameter information is acquired, the detection parameter information including at least one of a detection number, a control signaling format to be detected or an aggregation level; and the physical downlink control signaling detection is performed at the detection moment according to the detection parameter information.

In the implementation mode, when the physical downlink control signaling detection needs to be performed, the detection parameter information, such as the detection number, the control signaling format to be detected, the aggregation level and the like, is determined at first, and then the physical downlink control signaling detection is executed according to the detection parameter information.

The detection number is a detection number of the terminal on a transmission unit. For example, the terminal executes detection for 10 times on a symbol. The control signaling format to be detected refers to a control signaling format which needs to be detected. For example, the terminal only detects the downlink control signaling formats 1 and 2 on a symbol. The aggregation level may be 1/2/4/8 or higher, and different aggregation levels correspond to the number of resources occupied by transmission of a piece of downlink control signaling.

The detection parameter information and the detection moment may be configured by the base station for the terminal through the same signaling, and may also be configured for the terminal through different signaling.

In some embodiments, the operation that the detection parameter information is acquired includes: the detection parameter information is acquired according to a second predefined detection parameter, and the second predefined detection parameter includes the detection parameter information. Or, the operation that the detection parameter information is acquired includes: second configuration signaling is acquired, the second configuration signaling including the detection parameter information, and the detection parameter information is acquired from the second configuration signaling. Or, the operation that the detection parameter information is acquired includes: the second configuration signaling is acquired, the second configuration signaling including parameter indication information, the parameter indication information is acquired from the second configuration signaling, and the detection parameter information corresponding to the parameter indication information in the second configuration signaling is acquired according to a corresponding relationship between the parameter indication information and the detection parameter information. Or, the operation that the detection parameter information is acquired includes: the second configuration signaling is acquired, the second configuration signaling including modification information and the modification information being configured to indicate a part of the detection parameter information to be used which is different from detection parameter information in a predefined detection parameter, the modification information is acquired from the second configuration signaling, and the detection parameter information is obtained according to the predefined detection parameter and the modification information.

In the implementation mode, multiple methods adopted by the terminal to determine the detection parameter information are provided. For example, the detection parameter information is determined according to the predefined detection parameter, for example, configured in the transmission protocol, and in this manner, the detection parameter information may be simply acquired without interaction with the base station. For another example, the detection parameter information, the parameter indication information or the modification information is included in the second configuration signaling. In the implementation mode, the base station may flexibly configure the detection parameter information as required.

The second predefined detection parameter and the first predefined detection parameter may be the same predefined detection parameter, and may also be different predefined detection parameters.

The second configuration signaling may be the abovementioned first configuration signaling, such that the signaling overhead is reduced. Furthermore, both the second configuration signaling and the first configuration signaling are wakeup signaling, such that the signaling overhead is minimized. In another implementation mode, the second configuration signaling may also be independent signaling, and in such case, the second configuration signaling is sent prior to the wakeup signaling and may be implemented through radio resource control signaling, MAC-layer signaling or physical-layer signaling.

It is to be noted that S11 to S12 and the abovementioned optional steps may be freely combined.

Figure 5:
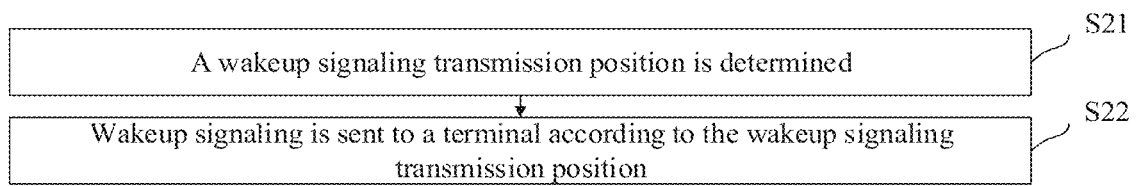
FIG. 5 is a flow chart showing a physical downlink control signaling detection method, according to an embodiment.

FIG. 5 is a flow chart showing a physical downlink control signaling detection method, according to an embodiment. The method may be executed by a base station. Referring to FIG. 5, the physical downlink control signaling detection method includes the following steps.

In S21, a wakeup signaling transmission position is determined.

The wakeup signaling transmission position determined by the base station is the same as a wakeup signaling transmission position determined by a terminal.

In S22, wakeup signaling is sent to a terminal according to the wakeup signaling transmission position, and the wakeup signaling is configured to instruct the terminal whether to perform physical downlink control signaling detection in a predetermined time window.

In the embodiment of the present disclosure, the base station determines whether the physical downlink control signaling detection needs to be performed in the predetermined time window through the wakeup signaling sent to the terminal, and then the terminal does not need to continuously perform the physical downlink control signaling detection, such that power is saved, and the energy consumption is reduced. The wakeup signaling is sent at a specified transmission position and also does not need to be continuously monitored, such that it is ensured that the energy consumption of the terminal in the whole process is relatively low.

In some embodiments, the method further includes: detection configuration information is sent to the terminal, and the detection configuration information includes the wakeup signaling transmission position.

In some embodiments, the operation that the detection configuration information is sent to the terminal includes: radio resource control signaling, MAC-layer signaling or physical-layer signaling including the detection configuration information is sent to the terminal.

In the implementation mode, the detection configuration information may be sent through the radio resource control signaling, the MAC-layer signaling or the physical-layer signaling, and may be sent by use of existing signaling or new signaling. For example, the MAC-layer signaling may specifically be a CE field in a MAC-layer PDU.

In some embodiments, the method further includes: first configuration signaling is sent to the terminal, and the first configuration signaling includes a detection moment for physical downlink control signaling detection of the terminal in the predetermined time window.

In some embodiments, the method further includes: second configuration signaling is sent to the terminal, the second configuration signaling includes detection parameter information for physical downlink control signaling detection of the terminal, and the detection parameter information includes at least one of a detection number, a control signaling format to be detected or an aggregation level. Or, the second configuration signaling includes parameter indication information, and the parameter indication information corresponds to the detection parameter information. Or, the second configuration signaling includes modification information, and the modification information is configured to indicate a part of the detection parameter information to be used which is different from detection parameter information in a predefined detection parameter of the terminal.

It is to be noted that S21 to S22 and the abovementioned optional steps may be freely combined.

Figure 6A:
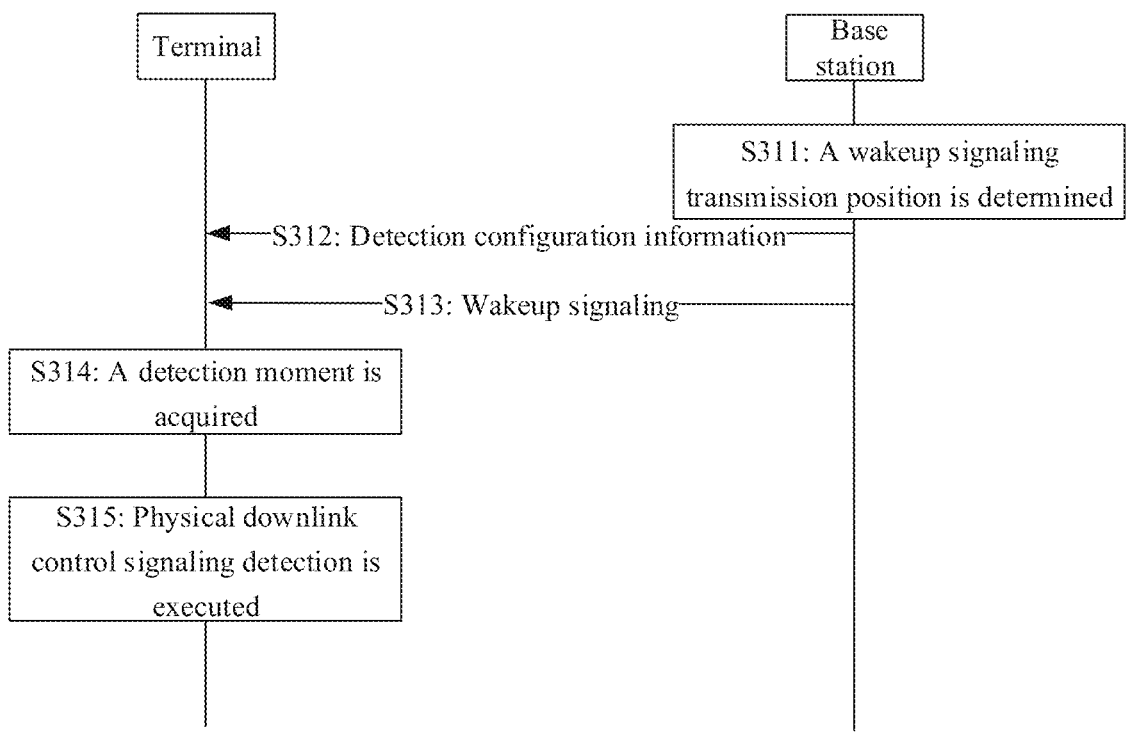
FIG. 6A is a flow chart showing a physical downlink control signaling detection method, according to an embodiment.

FIG. 6A is a flow chart showing a physical downlink control signaling detection method, according to an embodiment. The method may be executed by a terminal and a base station. Referring to FIG. 6A, the physical downlink control signaling detection method includes the following steps.

In S311, the base station determines a wakeup signaling transmission position.

In the step, the base station may determine the wakeup signaling transmission position according to a predefined configuration parameter. The predefined configuration parameter may be configured in a transmission protocol, and this manner is easy to implement. Or, the base station may flexibly determine the wakeup signaling transmission position according to a practical condition. For example, the base station determines whether the wakeup signaling needs to be sent to the terminal according to whether there is data to be sent of the terminal, and when there is the data to be sent of the terminal, the base station needs to send the wakeup signaling to the terminal. The base station determines the wakeup signaling transmission position according to an idle resource condition and information of a priority and the like of the terminal.

The wakeup signaling transmission position includes a time-domain position, may be a position of a transmission unit, for example, a serial number of the transmission unit, or may be before a certain transmission unit, or may be an offset value relative to a certain transmission unit. The transmission unit may be a frame, a subframe, a slot and a symbol.

In some embodiments, the wakeup signaling transmission position may also include at least one of frequency-domain position or space-domain position. The frequency-domain and/or space-domain position is an optional content. For example, part of frequency-domain resources in a carrier may be indicated in the transmission position to cause the terminal to perform detection on the part of frequency-domain resources in the carrier to avoid detecting the wakeup signaling in all frequency bands.

In S312, the base station sends detection configuration information to the terminal, and the detection configuration information includes the wakeup signaling transmission position. The terminal receives the detection configuration information sent by the base station.

The wakeup signaling transmission position in the detection configuration information is the same as the wakeup signaling transmission position in S311, such that it is ensured that the wakeup signaling sent by the base station may be received by the terminal.

The base station sends radio resource control signaling, MAC-layer signaling or physical-layer signaling including the detection configuration information to the terminal. Correspondingly, the terminal receives the radio resource control signaling, the MAC-layer signaling or the physical-layer signaling including the detection configuration information from the base station. In the implementation mode, the detection configuration information may be sent through the radio resource control signaling, the MAC-layer signaling or the physical-layer signaling, and may be sent by use of existing signaling or new signaling. For example, the MAC-layer signaling may specifically be a CE field in a MAC-layer PDU.

In some embodiments, the detection configuration information may further include a detection parameter for the wakeup signaling, and the detection parameter for the wakeup signaling includes at least one of a detection number, a control signaling format to be detected or an aggregation level.

In S313, the base station sends the wakeup signaling to the terminal according to the wakeup signaling transmission position, and the wakeup signaling is configured to instruct the terminal whether to perform physical downlink control signaling detection in a predetermined time window. The terminal receives the wakeup signaling sent by the base station according to the wakeup signaling transmission position. When the wakeup signaling is configured to instruct the terminal to perform the physical downlink control signaling detection in the predetermined time window, S314 is executed. When the wakeup signaling is configured to instruct the terminal not to perform the physical downlink control signaling detection in the predetermined time window, the flow is ended.

The wakeup signaling is used when a radio resource control connection is established between the terminal and the base station, and is configured to determine whether to perform the physical downlink control signaling detection in the predetermined time window. The wakeup signaling may be sent through the radio resource control signaling, the MAC-layer signaling or the physical-layer signaling.

The predetermined time window includes, but is not limited to, one transmission unit, two transmission units or multiple transmission units after the wakeup signaling transmission position.

The predetermined time window may be configured in advance, for example, configured in the transmission protocol, or is notified to the terminal through signaling sent by the base station, the signaling being independently designed or reusing other signaling such as the wakeup signaling, first configuration signaling, second configuration signaling, and the like.

When the detection configuration information includes the detection parameter for the wakeup signaling, the operation that the terminal receives the wakeup signaling sent by the base station according to the wakeup signaling transmission position may include: the terminal determines the detection parameter for the wakeup signaling according to the detection configuration information; and the wakeup signaling is detected at the wakeup signaling transmission position according to detection parameter information for the wakeup signaling.

In S314, the terminal acquires a detection moment for performing the physical downlink control signaling detection in the predetermined time window.

The operation that the detection moment for performing the physical downlink control signaling detection in the predetermined time window is acquired includes: the detection moment is acquired according to a first predefined detection parameter, and the first predefined detection parameter includes the detection moment. Or, the operation that the detection moment for performing the physical downlink control signaling detection in the predetermined time window is acquired includes: first configuration signaling is acquired, the first configuration signaling including the detection moment, and the detection moment is acquired from the first configuration signaling. The first configuration signaling may be the abovementioned wakeup signaling, such that the signaling overhead is reduced. In another implementation mode, the first configuration signaling may also be independent signaling, and in such case, the first configuration signaling is sent prior to the wakeup signaling and may be implemented through the radio resource control signaling, the MAC-layer signaling or the physical-layer signaling.

In the implementation mode, two methods adopted by the terminal to determine the detection moment are provided. One is determination according to the predefined detection parameter, for example, configuration in the transmission protocol, and in this manner, the detection moment may be simply acquired without interaction with the base station. The other is including the detection moment in the first configuration signaling. In the implementation mode, the base station may flexibly configure the detection moment as required.

The detection moment specifically refers to a time-domain position. The first predefined detection parameter or the first configuration signaling may further include a frequency-domain or space-domain position for the physical downlink control signaling detection, such that the terminal performs the physical downlink control signaling detection.

In the embodiment of the present disclosure, the detection moment may adopt different indication granularities. For example, the detection moment may indicate whether physical downlink control signaling detection needs to be performed in each slot in a predefined time window. For another example, the detection moment may indicate whether physical downlink control signaling detection needs to be performed in each subframe in the predefined time window.

For example, the predefined time window is one slot, and if the indication granularity is symbol, the detection moment indicates whether physical downlink control signaling detection needs to be performed on each symbol in the slot and the terminal performs the physical downlink control signaling detection on the symbol where detection needs. For example, in an implementation mode, the detection moment indicates 0010010, and it is indicated that the physical downlink control signaling detection is performed on third and sixth symbols in one slot. For another example, the predefined time window is one slot, and if the indication granularity is slot, the detection moment indicates whether physical downlink control signaling detection needs to be performed in the slot and the terminal performs the physical downlink control signaling detection on predefined symbols in the slot where detection needs (for example, all symbols in the slot).

In S315, the terminal executes the physical downlink control signaling detection at the detection moment.

The operation that the physical downlink control signaling detection is executed at the detection moment includes: detection parameter information is acquired, and the detection parameter information includes at least one of the detection number, the control signaling format to be detected or the aggregation level; and the physical downlink control signaling detection is performed at the detection moment according to the detection parameter information.

In the implementation mode, when the physical downlink control signaling detection needs to be performed, the detection parameter information, such as the detection number, the control signaling format to be detected and the aggregation level, is determined at first, and then the physical downlink control signaling detection is executed according to the detection parameter information.

The detection number is a detection number on a transmission unit. For example, the terminal executes detection for 10 times on a symbol. The control signaling format to be detected refers to a control signaling format which needs to be detected. For example, the terminal only detects formats 1 and 2 on a symbol. The aggregation level may be 1/2/4/8 or higher, and different aggregation levels correspond to the number of resources occupied by transmission of a piece of downlink control signaling.

The operation that the detection parameter information is acquired includes: the detection parameter information is acquired according to a second predefined detection parameter, and the second predefined detection parameter includes the detection parameter information. Or, the operation that the detection parameter information is acquired includes: second configuration signaling is acquired, the second configuration signaling includes the detection parameter information, and the detection parameter information is acquired from the second configuration signaling. Or, the operation that the detection parameter information is acquired includes: the second configuration signaling is acquired, the second configuration signaling includes parameter indication information, the parameter indication information is acquired from the second configuration signaling, and the detection parameter information corresponding to the parameter indication information in the second configuration signaling is acquired according to a corresponding relationship between the parameter indication information and the detection parameter information. Or, the operation that the detection parameter information is acquired includes: the second configuration signaling is acquired, the second configuration signaling includes modification information and the modification information is configured to indicate a part of the detection parameter information to be used which is different from detection parameter information in a predefined detection parameter, the modification information is acquired from the second configuration signaling, and the detection parameter information is obtained according to the predefined detection parameter and the modification information.

The second configuration signaling may be the abovementioned first configuration signaling, such that the signaling overhead is reduced. Furthermore, both the second configuration signaling and the first configuration signaling are wakeup signaling, such that the signaling overhead is minimized. In another implementation mode, the second configuration signaling may also be independent signaling, and in such case, the second configuration signaling is sent prior to the wakeup signaling and may be implemented through the radio resource control signaling, the MAC-layer signaling or the physical-layer signaling.

The corresponding relationship between the parameter indication information and the detection parameter information may be predefined or sent to the terminal by the base station through the radio resource control signaling, the MAC-layer signaling or the physical-layer signaling.

In the implementation mode, multiple methods adopted by the terminal to determine the detection parameter information are provided. For example, the detection parameter information is determined according to the predefined detection parameter, for example, configured in the transmission protocol, and in this manner, the detection parameter information may be simply acquired without interaction with the base station. For another example, the detection parameter information, the parameter indication information or the modification information is included in the second configuration signaling. In the implementation mode, the base station may flexibly configure the detection parameter information as required.

The second predefined detection parameter and the first predefined detection parameter may be the same predefined detection parameter and may also be different predefined detection parameters.

Acquisition of the detection moment and acquisition of the detection parameter information in S314 and S315 may be implemented randomly. When the detection moment and the detection parameter information are configured in the same predefined detection parameter or both the detection moment and the detection parameter information are included in the wakeup signaling, the terminal may simultaneously acquire the detection moment and the detection parameter information.

In the implementation modes of S314 and S315, both the detection moment and detection parameter information for the physical downlink control signaling detection may be determined according to the wakeup signaling, and the wakeup signaling is generated and sent by the base station. Therefore, in the embodiment of the present disclosure, the method executed by the base station further includes: at least one of the detection moment or the detection parameter information for physical downlink control signaling detection of the terminal is determined.

Furthermore, the operation that the base station determines at least one of the detection moment or the detection parameter information for the physical downlink control signaling detection of the terminal includes: a detection capability or service condition information of the terminal is acquired; and at least one of the detection moment or the detection parameter information is determined according to the detection capability or the service condition information of the terminal. For example, if the detection capability of the terminal is relatively high, the base station may configure a relatively large detection number for the terminal. Therefore, in this manner, the terminal may implement detection relatively flexibly, and inflexible physical downlink control signaling detection caused by semi-static configuration of the detection moment and the detection parameter information through radio resource control signaling in a conventional art may be avoided.

The operation that the detection capability or the service condition information of the terminal is acquired includes: the detection capability or the service condition information sent by the terminal is received.

Figure 6B:
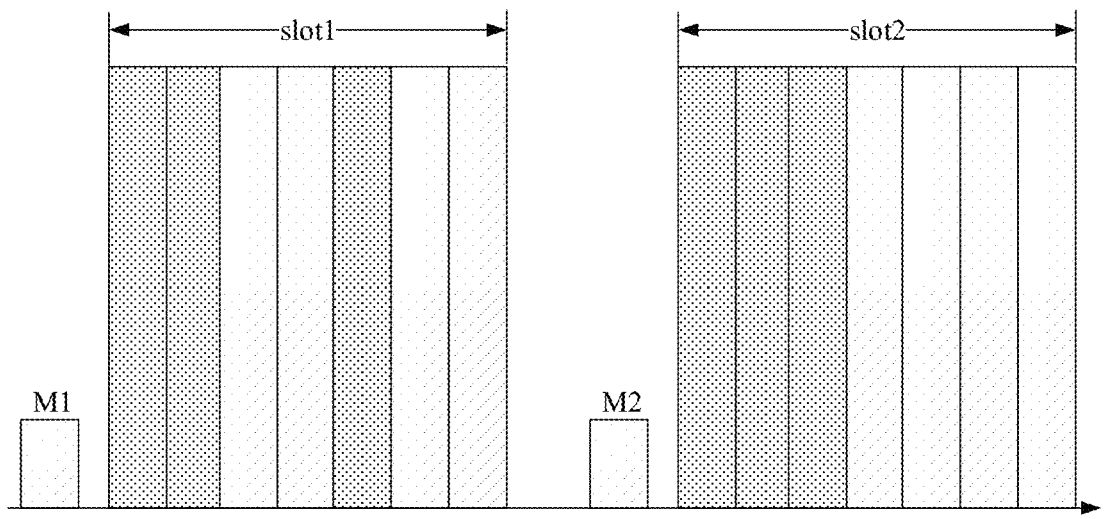
FIG. 6B to FIG. 6D are schematic diagrams illustrating a physical downlink control signaling detection solution, according to an embodiment.
Figure 6C:
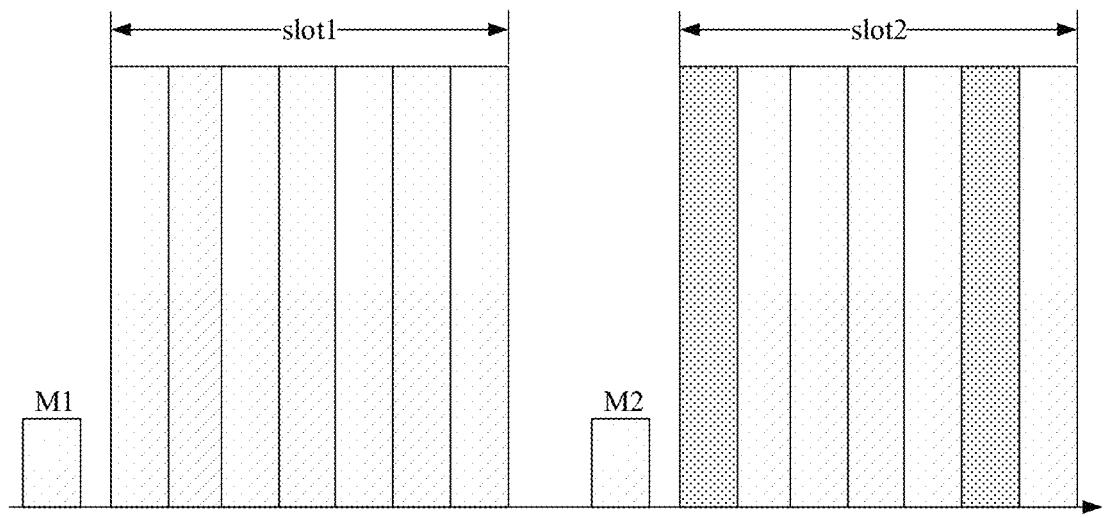
Figure 6D:
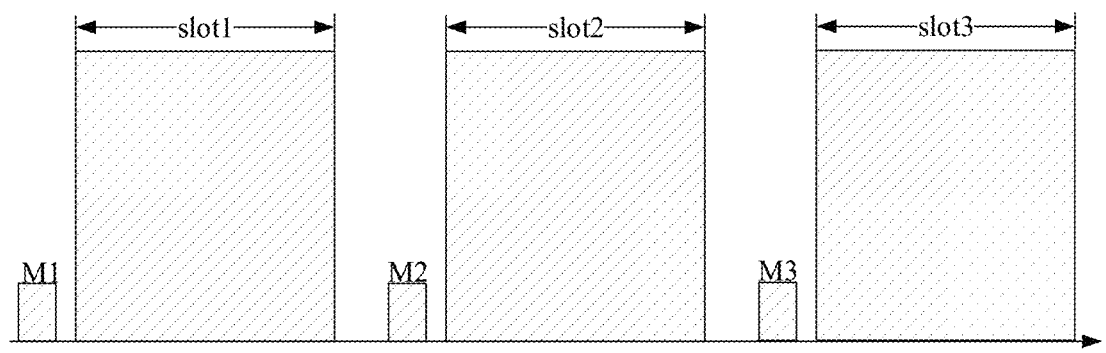

FIG. 6B to FIG. 6D are schematic diagrams illustrating a physical downlink control signaling detection solution, according to an embodiment of the present disclosure.

Several implementation modes provided by S314 to S315 will be described with examples below in combination with FIG. 6B to FIG. 6D.

Referring to FIG. 6B, the terminal determines the detection moment, for example, first, second and fifth symbols in a slot 1 and first to third symbols in a slot 2 (shaded parts in the figure), for the physical downlink control signaling detection according to the first predefined detection parameter. The terminal receives wakeup signaling M1 sent by the base station, and the wakeup signaling M1 indicates that the terminal does not need to perform the physical downlink control signaling detection in a slot in a predetermined time window, such that the terminal does not perform the physical downlink control signaling detection in the slot 1 in the predetermined time window even though the terminal has predetermined the detection moment (the first, second and fifth symbols) for the physical downlink control signaling detection. The terminal receives wakeup signaling M2 sent by the base station, and the wakeup signaling M2 indicates that the terminal needs to perform the physical downlink control signaling detection in the slot in the predetermined time window, such that the terminal needs to execute the physical downlink control signaling detection in the slot 2 in the predetermined time window according to pre-configured detection parameter information. It is to be noted that, in FIG. 6B, a wakeup signaling (M1) transmission position may be close to the slot 1 and may also not be close to the slot 1, and a wakeup signaling (M2) transmission position may be close to the slot 1 and/or the slot 2 and may also not be close to the slot 1 and/or the slot 2.

Referring to FIG. 6C, the difference between the implementation mode and FIG. 6B is that the terminal does not need to acquire the detection moment for the physical downlink control signaling detection configured by the base station in advance. The terminal receives the wakeup signaling M1 sent by the base station, and the wakeup signaling M1 indicates that the terminal does not need to perform the physical downlink control signaling detection in the slot in the predetermined time window, such that the terminal does not perform the physical downlink control signaling detection in the slot 1 in the predetermined time window. The terminal receives the wakeup signaling M2 sent by the base station before the slot 2, and the wakeup signaling M2 indicates that the terminal needs to perform the physical downlink control signaling detection in the slot in the predetermined time window. In addition, the wakeup signaling further needs to include the detection moment and the detection parameter information. For example, the wakeup signaling M2 includes the detection moment, i.e., the first and sixth symbols, and the wakeup signaling M2 further includes the detection parameter information. For example, on the first symbol of the slot 2, the terminal needs to execute detection for 10 times, a detection object is the downlink control signaling formats 1 and 2 and only the condition that the aggregation level is 8 needs to be detected; and on the sixth symbol, the terminal further needs to execute detection for 10 times, a detection object is a downlink control signaling format 3 and the condition that the aggregation level is 2 and 4 needs to be detected. Therefore, in the slot 2 in the predetermined time window, the terminal needs to perform the physical downlink control signaling detection on the first and sixth symbols according to the detection parameter information.

Referring to FIG. 6D, the difference between the implementation mode and FIG. 6C is that manners for indicating the detection parameter information in the wakeup signaling are different.

In an implementation mode, multiple types of detection parameter information are preset in the terminal, and each type of detection parameter information corresponds to a piece of parameter indication information. The terminal receives the wakeup signaling M1 sent by the base station, the wakeup signaling M1 indicates that the terminal needs to perform the physical downlink control signaling detection in the slot in the predetermined time window and parameter indication information in the wakeup signaling M1 is 00, and in such case, the terminal detects the physical downlink control signaling by use of detection parameter information 1 in the slot 1 in the predetermined time window. The terminal receives the wakeup signaling M2 sent by the base station, the wakeup signaling M2 indicates that the terminal needs to perform the physical downlink control signaling detection in the slot in the predetermined time window and parameter indication information in the wakeup signaling M2 is 01, and in such case, the terminal detects the physical downlink control signaling by use of detection parameter information 2 in the slot 2 in the predetermined time window. The terminal receives wakeup signaling M3 sent by the base station, the wakeup signaling M3 indicates that the terminal needs to perform the physical downlink control signaling detection in the slot in the predetermined time window and parameter indication information in the wakeup signaling M3 is 10, and in such case, the terminal detects the physical downlink control signaling by use of detection parameter information 4 in a slot 3 in the predetermined time window.

In another implementation mode, the wakeup signaling may also only include the modification information, and the modification information is configured to indicate the part of the detection parameter information to be used which is different from the detection parameter information in the predefined detection parameter. The terminal obtains the detection parameter information according to the predefined detection parameter and the modification information and then performs the physical downlink control signaling detection.

Figure 6E:
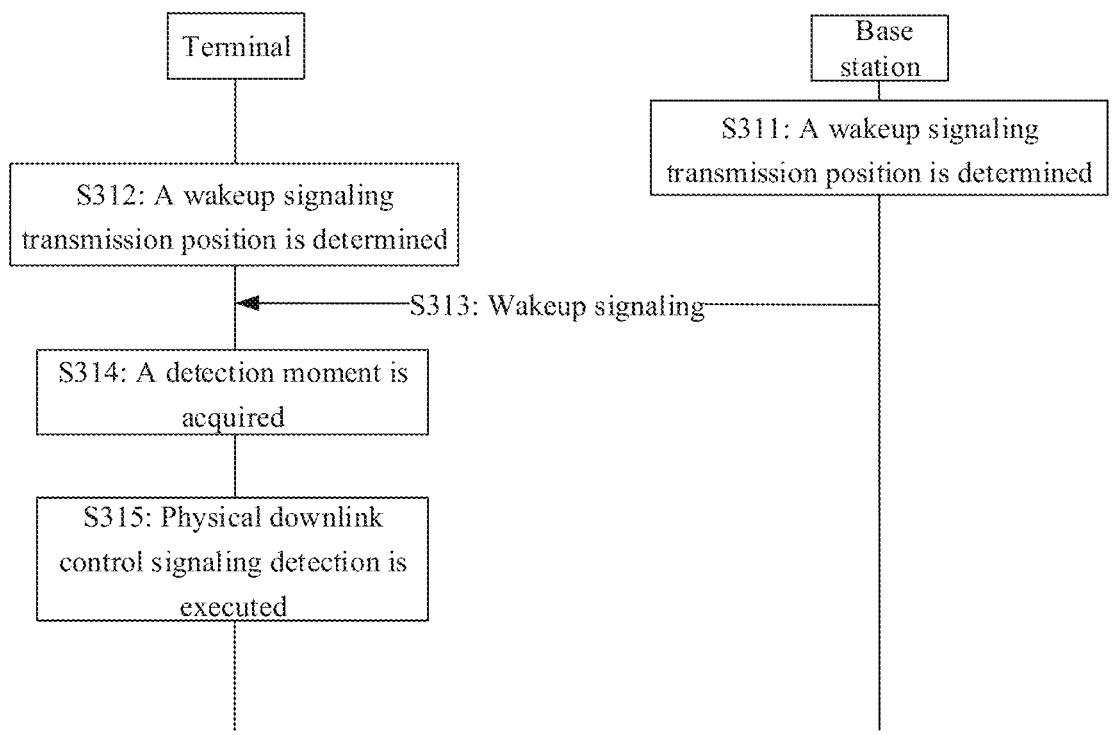
FIG. 6E is a flow chart showing a physical downlink control signaling detection method, according to an embodiment.

FIG. 6E is a flow chart showing a physical downlink control signaling detection method, according to an embodiment. The difference between the method and the method illustrated in FIG. 6A is that manners the terminal acquires the wakeup signaling transmission position are different. Referring to FIG. 6E, the physical downlink control signaling detection method includes the following steps.

In S321, a base station determines a wakeup signaling transmission position.

A detailed implementation process of the step is the same as S311.

In S322, a terminal acquires the wakeup signaling transmission position according to a predefined configuration parameter, and the predefined configuration parameter includes the wakeup signaling transmission position.

S321 and S322 may be executed randomly.

In S323, the base station sends wakeup signaling to the terminal according to the wakeup signaling transmission position, and the wakeup signaling is configured to instruct the terminal whether to perform physical downlink control signaling detection in a predetermined time window. The terminal receives the wakeup signaling sent by the base station according to the wakeup signaling transmission position. When the wakeup signaling is configured to instruct the terminal to perform the physical downlink control signaling detection in the predetermined time window, S324 is executed. When the wakeup signaling is configured to instruct the terminal not to perform the physical downlink control signaling detection in the predetermined time window, the flow is ended.

A detailed implementation process of the step is substantially the same as S313, and the only difference is that manners for acquiring a detection parameter for the wakeup signaling are different. In the step, the terminal may acquire the detection parameter for the wakeup signaling according to the predefined configuration parameter, and the predefined configuration parameter includes the detection parameter for the wakeup signaling.

In S324, the terminal acquires a detection moment for performing the physical downlink control signaling detection in the predetermined time window.

A detailed implementation process of the step is the same as S314.

In S325, the terminal executes the physical downlink control signaling detection at the detection moment.

A detailed implementation process of the step is the same as S315.

Figure 7:
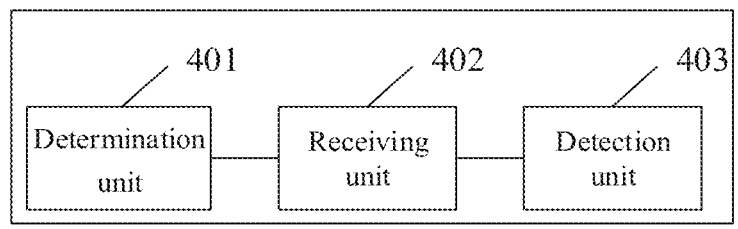
FIG. 7 is a structure diagram of a physical downlink control signaling detection device, according to an embodiment.

FIG. 7 is a structure diagram of a physical downlink control signaling detection device, according to an embodiment. Referring to FIG. 7, the physical downlink control signaling detection device includes a determination unit 401 and a receiving unit 402.

The determination unit 401 is configured to determine a wakeup signaling transmission position. The receiving unit 402 is configured to receive wakeup signaling sent by a base station according to the wakeup signaling transmission position, and the wakeup signaling is configured to instruct a terminal whether to perform physical downlink control signaling detection in a predetermined time window.

In an implementation mode of the present disclosure, the determination unit 401 is configured to acquire the wakeup signaling transmission position according to a predefined configuration parameter, and the predefined configuration parameter includes the wakeup signaling transmission position.

Or, the receiving unit 402 is further configured to receive detection configuration information sent by the base station, and the detection configuration information includes the wakeup signaling transmission position. The determination unit 401 is configured to acquire the wakeup signaling transmission position according to the detection configuration information.

In an implementation mode of the present disclosure, the receiving unit 402 is configured to receive radio resource control signaling, MAC-layer signaling or physical-layer signaling including the detection configuration information sent by the base station.

In an implementation mode of the present disclosure, when the wakeup signaling is configured to instruct the terminal to perform the physical downlink control signaling detection in the predetermined time window, the determination unit 401 is further configured to acquire a detection moment for performing the physical downlink control signaling detection in the predetermined time window. The device further includes a detection unit 403, configured to execute the physical downlink control signaling detection at the detection moment.

In an implementation mode of the present disclosure, the determination unit 401 is configured to acquire the detection moment according to a first predefined detection parameter, and the first predefined detection parameter includes the detection moment.

Or, the determination unit 401 is configured to acquire first configuration signaling, the first configuration signaling including the detection moment, and acquire the detection moment from the first configuration signaling.

In an implementation mode of the present disclosure, the determination unit 401 is further configured to acquire detection parameter information, and the detection parameter information includes at least one of a detection number, a control signaling format to be detected or an aggregation level. The detection unit 403 is configured to perform the physical downlink control signaling detection at the detection moment according to the detection parameter information.

In an implementation mode of the present disclosure, the determination unit 401 is configured to acquire the detection parameter information according to a second predefined detection parameter, and the second predefined detection parameter includes the detection parameter information.

Or, the determination unit 401 is configured to acquire second configuration signaling, the second configuration signaling including the detection parameter information, and acquire the detection parameter information from the second configuration signaling.

Or, the determination unit 401 is configured to acquire the second configuration signaling, the second configuration signaling including parameter indication information, acquire the parameter indication information from the second configuration signaling, and acquire the detection parameter information corresponding to the parameter indication information in the second configuration signaling according to a corresponding relationship between the parameter indication information and the detection parameter information.

Or, the determination unit 401 is configured to acquire the second configuration signaling, the second configuration signaling including modification information and the modification information being configured to indicate a part of the detection parameter information to be used which is different from detection parameter information in a predefined detection parameter, acquire the modification information from the second configuration signaling, and obtain the detection parameter information according to the predefined detection parameter and the modification information.

A manner the determination unit 401 determines the wakeup signaling transmission position may refer to S312 or S412. A manner the receiving unit 402 receives the wakeup signaling may refer to S313 or S413. A manner the detection unit 403 performs the physical downlink control signaling detection may refer to S314 and S315 or S414 and S415.

Detailed descriptions are omitted herein.

Figure 8:
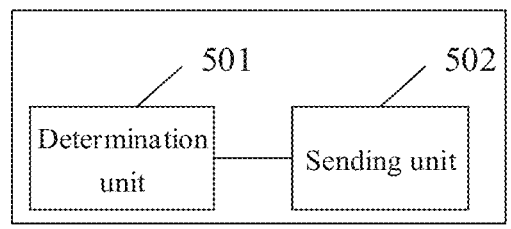
FIG. 8 is a structure diagram of a physical downlink control signaling detection device, according to an embodiment.

FIG. 8 is a structure diagram of a physical downlink control signaling detection device, according to an embodiment. Referring to FIG. 8, the physical downlink control signaling detection device includes a determination unit 501 and a sending unit 502.

The determination unit 501 is configured to determine a wakeup signaling transmission position. The sending unit 502 is configured to send wakeup signaling to a terminal according to the wakeup signaling transmission position, and the wakeup signaling is configured to instruct a terminal whether to perform physical downlink control signaling detection in a predetermined time window.

In an implementation mode of the present disclosure, the sending unit 502 is further configured to send detection configuration information to the terminal, and the detection configuration information includes the wakeup signaling transmission position.

In an implementation mode of the present disclosure, the sending unit 502 is configured to send radio resource control signaling, MAC-layer signaling or physical-layer signaling including the detection configuration information to the terminal.

In an implementation mode of the present disclosure, the sending unit 502 is further configured to send first configuration signaling to the terminal, and the first configuration signaling includes a detection moment for physical downlink control signaling detection of the terminal in the predetermined time window.

In an implementation mode of the present disclosure, the sending unit 502 is further configured to send second configuration signaling to the terminal, the second configuration signaling includes detection parameter information for physical downlink control signaling detection of the terminal, and the detection parameter information includes at least one of a detection number, a control signaling format to be detected or an aggregation level. Or, the second configuration signaling includes parameter indication information, and the parameter indication information corresponds to the detection parameter information. Or, the second configuration signaling includes modification information, and the modification information is configured to indicate a part, different from detection parameter information in a predefined detection parameter, of the detection parameter information to be used by the terminal.

A manner the determination unit 501 determines the wakeup signaling transmission position may refer to S311 or S411. A manner the sending unit 502 sends the wakeup signaling may refer to S313 or S413. Detailed descriptions are omitted herein.

Figure 9:
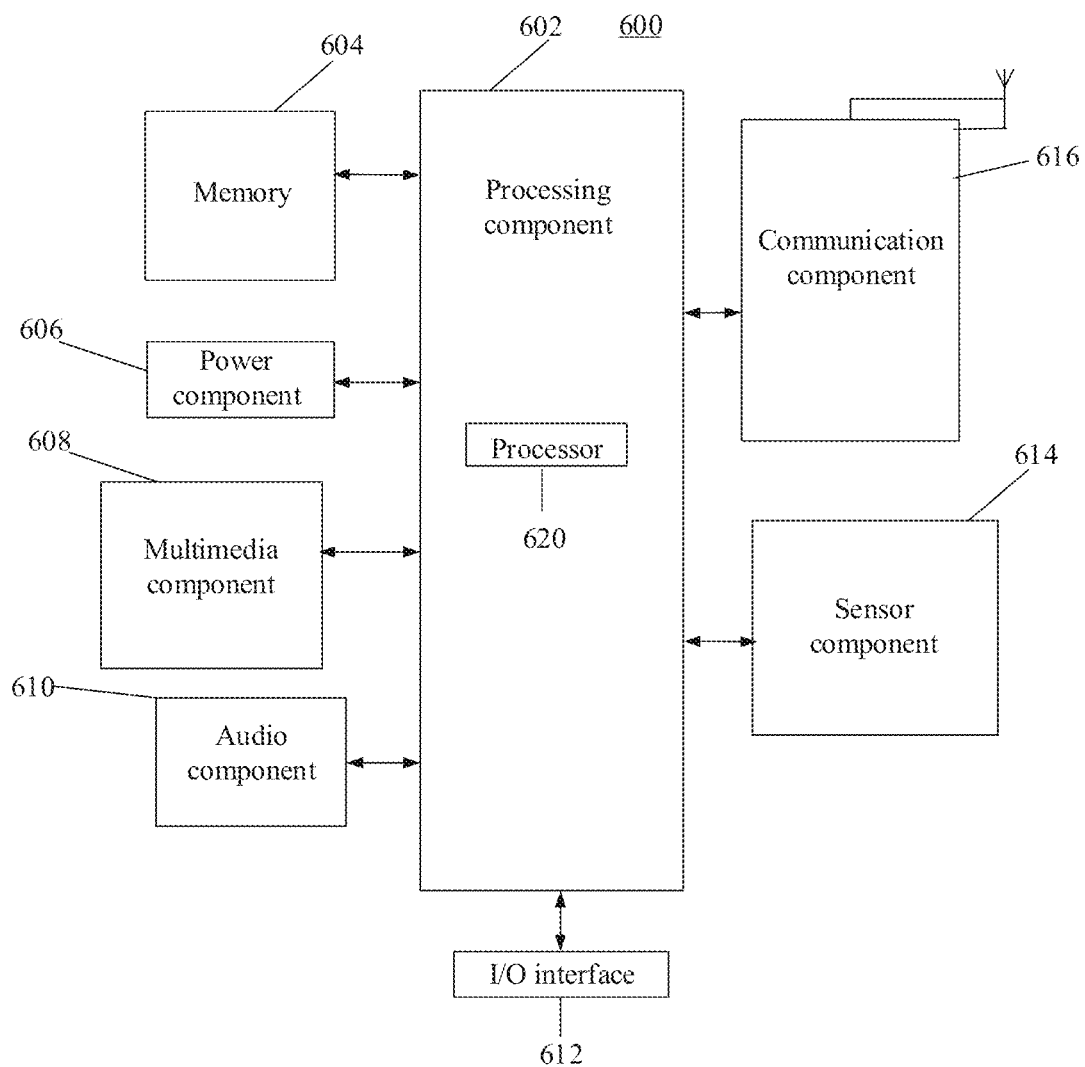
FIG. 9 is a block diagram of a physical downlink control signaling detection device, according to an embodiment.

FIG. 9 is a block diagram of a physical downlink control signaling detection device 600, according to an embodiment. The device 600 may be the abovementioned terminal. Referring to FIG. 9, the physical downlink control signaling detection device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the physical downlink control signaling detection device 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and other components. For instance, the processing component 602 may include a multimedia module to facilitate interaction between the multimedia component 608 and the processing component 602.

The memory 604 is configured to store various types of data to support the operation of the physical downlink control signaling detection device 600. Examples of such data include instructions for any applications or methods operated on the physical downlink control signaling detection device 600, contact data, phonebook data, messages, pictures, video, etc. The memory 604 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 606 provides power for various components of the physical downlink control signaling detection device 600. The power component 606 may include a power management system, one or more power supplies, and other components associated with generation, management and distribution of power for the physical downlink control signaling detection device 600.

The multimedia component 608 includes a screen providing an output interface between the physical downlink control signaling detection device 600 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 608 includes a front camera and/or a rear camera. The front camera and/or the rear camera may receive external multimedia data when the physical downlink control signaling detection device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a microphone (MIC), and the MIC is configured to receive an external audio signal when the physical downlink control signaling detection device 600 is in an operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and peripheral interface modules, such as a keyboard, a click wheel, buttons, and the like. The buttons may include, but are not limited to: a home button, a volume button, a starting button and a locking button.

The sensor component 614 includes one or more sensors configured to provide status assessments in various aspects for the physical downlink control signaling detection device 600. For instance, the sensor component 614 may detect an on/off status of the physical downlink control signaling detection device 600 and relative positioning of components, such as a display and small keyboard of the physical downlink control signaling detection device 600, and the sensor component 614 may further detect a change in a position of the physical downlink control signaling detection 600 or a component of the physical downlink control signaling detection device 600, presence or absence of contact between the user and the physical downlink control signaling detection device 600, orientation or acceleration/deceleration of the physical downlink control signaling detection device 600 and a change in temperature of the physical downlink control signaling detection device 600. The sensor component 614 may include a proximity sensor configured to detect presence of an object nearby without any physical contact. The sensor component 614 may also include a light sensor, such as a complementary metal oxide semiconductor (CMOS) or charge coupled device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wireless communication between the physical downlink control signaling detection device 600 and other devices. In the embodiments of the present disclosure, the communication component 616 may access a communication-standard-based wireless network, for example, 2nd-generation (2G), 3rd-generation (3G), 4th-generation (4G), 5G or a combination thereof, thereby implementing physical downlink control signaling detection. In an embodiment, the communication component 616 receives a broadcast signal or broadcast associated information from an external broadcast management system through a broadcast channel. In some embodiments, the communication component 616 further includes a near field communication (NFC) module. For example, the NFC module may be implemented based on a radio frequency identification (RFID) technology, an infrared data association (IrDA) technology, an ultra-wide band (UWB) technology, a Bluetooth (BT) technology, and other technologies.

In an embodiment, the physical downlink control signaling detection device 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the physical downlink control signaling detection method.

In an embodiment, there is also provided a non-transitory computer-readable storage medium including instructions, such as included in the memory 604, executable by the processor 620 of the physical downlink control signaling detection device 600 for performing the physical downlink control signaling detection methods. For example, the non-transitory computer-readable storage medium may be a ROM, a random access memory (RAM), a compact disc read-only memory (CD-ROM), a magnetic tape, a floppy disc, an optical data storage device, and the like.

Figure 10:
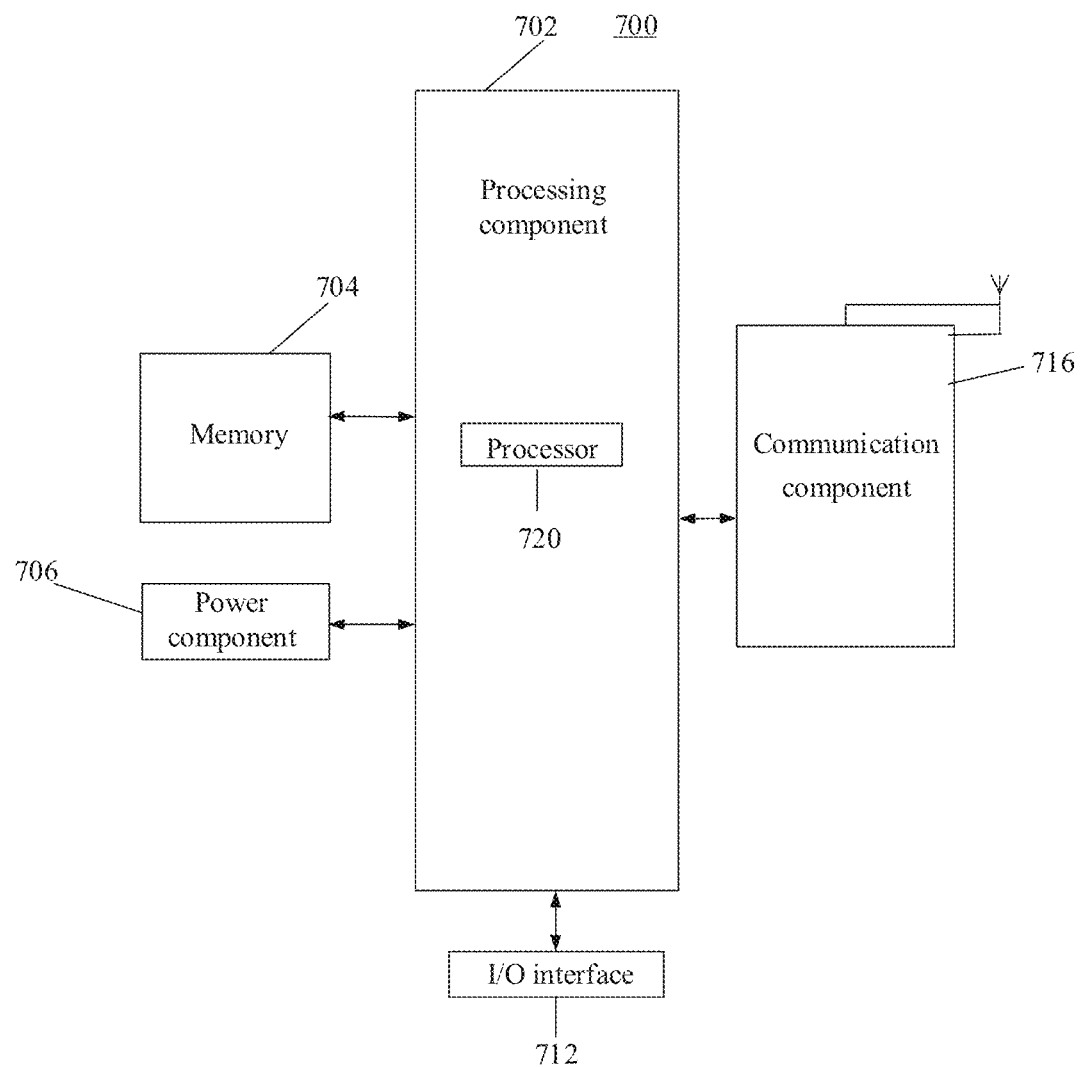
FIG. 10 is a block diagram of a physical downlink control signaling detection device, according to an embodiment.

FIG. 10 is a block diagram of a physical downlink control signaling detection device 700, according to an embodiment. The device 700 may be the abovementioned base station. Referring to FIG. 10, the physical downlink control signaling detection device 700 may include one or more of the following components: a processing component 702, a memory 704, a power component 706, an I/O interface 712 and a communication component 716.

The processing component 702 typically controls overall operations of the physical downlink control signaling detection device 700, such as the operations associated with display, telephone calls, data communications, camera operations, and recording operations. The processing component 702 may include one or more processors 720 to execute instructions to perform all or part of the steps in the abovementioned method. Moreover, the processing component 702 may include one or more modules which facilitate interaction between the processing component 702 and other components. For instance, the processing component 702 may include a multimedia module to facilitate interaction between the multimedia component 708 and the processing component 702.

The memory 704 is configured to store various types of data to support the operation of the physical downlink control signaling detection device 700. Examples of such data include instructions for any applications or methods operated on the physical downlink control signaling detection device 700, contact data, phonebook data, messages, pictures, video, etc. The memory 704 may be implemented by any type of volatile or non-volatile memory devices, or a combination thereof, such as an SRAM, an EEPROM, an EPROM, a PROM, a ROM, a magnetic memory, a flash memory, and a magnetic or optical disk.

The power component 706 provides power for various components of the physical downlink control signaling detection device 700. The power component 706 may include a power management system, one or more power supplies, and other components associated with generation, management and distribution of power for the physical downlink control signaling detection device 700.

The I/O interface 712 provides an interface between the processing component 702 and peripheral interface modules, such as a keyboard, a click wheel, buttons, and the like. The buttons may include, but are not limited to: a home button, a volume button, a starting button and a locking button.

The communication component 716 is configured to facilitate wireless communication between the base station and another device. In the embodiments of the present disclosure, the communication component 716 may provide a communication-standard-based wireless network, for example, 2G, 3G, 4G, 5G or a combination thereof, thereby implementing connection with a terminal device.

In an embodiment, the physical downlink control signaling detection device 700 may be implemented by one or more ASICs, DSPs, DSPDs, PLDs, FPGAs, controllers, micro-controllers, microprocessors or other electronic components, and is configured to execute the physical downlink control signaling detection method.

In an embodiment, there is also provided a non-transitory computer-readable storage medium including instructions, such as included in the memory 704, executable by the processor 720 of the physical downlink control signaling detection device 700 for performing the physical downlink control signaling detection methods. For example, the non-transitory computer-readable storage medium may be a ROM, a RAM, a CD-ROM, a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof

What is claimed is:

1. A physical downlink control signaling monitoring method, performed by a terminal, comprising:
  in response to receiving radio resource control signaling sent by a base station, determining at least one transmission position of a wakeup signaling, wherein the radio resource control signaling determines the at least one transmission position of the wakeup signaling;
  receiving the wakeup signaling sent by the base station according to the at least one transmission position of the wakeup signaling, wherein the wakeup signaling is configured to instruct the terminal whether to perform physical downlink control signaling monitoring in a predetermined time window; wherein the predetermined time window comprises one or more transmission units after the at least one transmission position of the wakeup signaling; and
  acquiring, in response to the wakeup signaling configured to instruct the terminal to perform the physical downlink control signaling monitoring in the predetermined time window, a monitoring occasion for performing the physical downlink control signaling monitoring in the predetermined time window; wherein the monitoring occasion determines a time resource within the predetermined time window for monitoring a physical downlink control signaling;
  wherein the one or more transmission units in which the physical downlink control signaling monitoring needs to be performed in the predetermined time window correspond to monitoring parameter information, and the monitoring parameter information comprises at least one of following information: a monitoring number, a control signaling format to be monitored or an aggregation level.

2. The method of claim 1, wherein determining the at least one transmission position of the wakeup signaling comprises:
  acquiring the at least one transmission position of the wakeup signaling according to a predefined configuration parameter, the predefined configuration parameter comprising the at least one transmission position of the wakeup signaling; or
  receiving monitoring configuration information sent by the base station, the monitoring configuration information comprising the at least one transmission position of the wakeup signaling.

3. The method of claim 2, wherein receiving the monitoring configuration information sent by the base station comprises:
  receiving media access control (MAC)-layer signaling or physical-layer signaling, wherein the MAC-layer signaling or the physical-layer signaling comprises the monitoring configuration information sent by the base station.

4. The method of claim 1, wherein acquiring the monitoring occasion for performing the physical downlink control signaling monitoring in the predetermined time window comprises:
acquiring the monitoring occasion according to a first predefined monitoring parameter, the first predefined monitoring parameter comprising the monitoring occasion; or
acquiring first configuration signaling, the first configuration signaling comprising the monitoring occasion, and acquiring the monitoring occasion from the first configuration signaling.

5. The method of claim 1, wherein executing the physical downlink control signaling monitoring at the monitoring occasion comprises:
acquiring the monitoring parameter information; and
performing the physical downlink control signaling monitoring at the monitoring occasion according to the monitoring parameter information.

6. The method of claim 5, wherein acquiring the monitoring parameter information comprises:
acquiring the monitoring parameter information according to a second predefined monitoring parameter, the second predefined monitoring parameter comprising the monitoring parameter information; or
acquiring second configuration signaling, the second configuration signaling comprising the monitoring parameter information, and acquiring the monitoring parameter information from the second configuration signaling; or
acquiring the second configuration signaling, the second configuration signaling comprising parameter indication information; acquiring the parameter indication information from the second configuration signaling; and acquiring the monitoring parameter information corresponding to the parameter indication information in the second configuration signaling according to a corresponding relationship between the parameter indication information and the monitoring parameter information; or
acquiring the second configuration signaling, the second configuration signaling acquiring the second configuration signaling, the second configuration signaling comprising modification information and the modification information being configured to indicate a part of the monitoring parameter information to be used which is different from monitoring parameter information in a predefined monitoring parameter; acquiring the modification information from the second configuration signaling; and obtaining the monitoring parameter information according to the predefined monitoring parameter and the modification information.

7. A physical downlink control signaling monitoring method, performed by a base station, comprising:
sending radio resource control signaling to a terminal, and determining at least one transmission position of a wakeup signaling, wherein the radio resource control signaling is for determining the at least one transmission position of the wakeup signaling; and
sending wakeup signaling to the terminal according to the at least one transmission position of the wakeup signaling, the wakeup signaling being configured to instruct the terminal whether to perform physical downlink control signaling monitoring in a predetermined time window; wherein the predetermined time window comprises one or more transmission units after the at least one transmission position of the wakeup signaling; in response to the wakeup signaling configured to instruct the terminal to perform the physical downlink control signaling monitoring in the predetermined time window, the terminal is configured to acquire a monitoring occasion for performing the physical downlink control signaling monitoring in the predetermined time window; wherein the monitoring occasion determines a time resource within the predetermined time window for monitoring a physical downlink control signaling;
wherein the one or more transmission units in which the physical downlink control signaling monitoring needs to be performed in the predetermined time window correspond to monitoring parameter information, and the monitoring parameter information comprises at least one of following information: a monitoring number, a control signaling format to be monitored or an aggregation level.

8. The method of claim 7, further comprising:
sending monitoring configuration information to the terminal, the monitoring configuration information comprising the at least one transmission position of the wakeup signaling.

9. The method of claim 8, wherein sending the monitoring configuration information to the terminal comprises:
sending media access control (MAC)-layer signaling or physical-layer signaling; wherein the MAC-layer signaling or the physical-layer signaling comprises the monitoring configuration information to the terminal.

10. The method of claim 7, further comprising:
sending first configuration signaling to the terminal, the first configuration signaling comprising a monitoring occasion for physical downlink control signaling monitoring of the terminal in the predetermined time window.

11. The method of claim 7, further comprising:
sending second configuration signaling to the terminal, the second configuration signaling comprising the monitoring parameter information for physical downlink control signaling monitoring of the terminal; or
the second configuration signaling comprising parameter indication information and the parameter indication information corresponding to the monitoring parameter information; or,
the second configuration signaling comprising modification information and the modification information being configured to indicate a part of the monitoring parameter information to be used by the terminal which is different from monitoring parameter information in a predefined monitoring parameter.

12. A physical downlink control signaling monitoring device, applied to a terminal, comprising:
a processor; and
a memory for storing instructions executable by the processor;
wherein the processor is configured to:
in response to receiving radio resource control signaling sent by a base station, determine at least one transmission position of a wakeup signaling, wherein the radio resource control signaling determines the at least one transmission position of the wakeup signaling;
receive the wakeup signaling sent by the base station according to the at least one transmission position of the wakeup signaling, wherein the wakeup signaling is configured to instruct the terminal whether to perform physical downlink control signaling monitoring in a predetermined time window; wherein the predetermined time window comprises one or more transmission units after the at least one transmission position of the wakeup signaling; and acquire, in response to the wakeup signaling configured to instruct the terminal to perform the physical downlink control signaling monitoring in the predetermined time window, a monitoring occasion for performing the physical downlink control signaling monitoring in the predetermined time window; wherein the monitoring occasion determines a time resource within the predetermined time window for monitoring a physical downlink control signaling;

wherein the one or more transmission units in which the physical downlink control signaling monitoring needs to be performed in the predetermined time window correspond to monitoring parameter information, and the monitoring parameter information comprises at least one of following information: a monitoring number, a control signaling format to be monitored or an aggregation level.

13. The device of claim 12, wherein the processor is configured to:

acquire the at least one transmission position of the wakeup signaling according to a predefined configuration parameter, the predefined configuration parameter comprising the at least one transmission position of the wakeup signaling; or receive monitoring configuration information sent by the base station, the monitoring configuration information comprising the at least one transmission position of the wakeup signaling, and acquire the at least one transmission position of the wakeup signaling according to the monitoring configuration information.

14. The device of claim 13, wherein the processor is configured to receive media access control (MAC)-layer signaling or physical-layer signaling; wherein the MAC-layer signaling or the physical-layer signaling comprises the monitoring configuration information sent by the base station.

15. The device of claim 12, wherein the processor is configured to:

acquire the monitoring occasion according to a first predefined monitoring parameter, the first predefined monitoring parameter comprising the monitoring occasion; or acquire first configuration signaling, the first configuration signaling comprising the monitoring occasion, and acquire the monitoring occasion from the first configuration signaling.

16. The device of claim 12, wherein the processor is further configured to:

acquire the monitoring parameter information; and perform the physical downlink control signaling monitoring at the monitoring occasion according to the monitoring parameter information.

17. The device of claim 16, wherein the processor is configured to:

acquire the monitoring parameter information according to a second predefined monitoring parameter, the second predefined monitoring parameter comprising the monitoring parameter information; or acquire second configuration signaling, the second configuration signaling comprising the monitoring parameter information, and acquire the monitoring parameter information from the second configuration signaling; or acquire the second configuration signaling, the second configuration signaling comprising parameter indication information; acquire the parameter indication information from the second configuration signaling; and acquire the monitoring parameter information corresponding to the parameter indication information in the second configuration signaling according to a corresponding relationship between the parameter indication information and the monitoring parameter information; or acquire the second configuration signaling, the second configuration signaling acquire the second configuration signaling, the second configuration signaling comprising modification information and the modification information being configured to indicate a part of the monitoring parameter information to be used which is different from monitoring parameter information in a predefined monitoring parameter; acquire the modification information from the second configuration signaling; and obtain the monitoring parameter information according to the predefined monitoring parameter and the modification information.

18. A physical downlink control signaling monitoring device for performing the physical downlink control signaling monitoring method of claim 7, comprising:

a processor; and a memory for storing instructions executable by the processor;

wherein the processor is configured to:

send radio resource control signaling to a terminal, and determine at least one transmission position of a wakeup signaling, wherein the radio resource control signaling is for determining the at least one transmission position of the wakeup signaling; and send wakeup signaling to the terminal according to the at least one transmission position of the wakeup signaling, the wakeup signaling being configured to instruct the terminal whether to perform physical downlink control signaling monitoring in a predetermined time window; wherein the predetermined time window comprises one or more transmission units after the at least one transmission position of the wakeup signaling; in response to the wakeup signaling configured to instruct the terminal to perform the physical downlink control signaling monitoring in the predetermined time window, the terminal is configured to acquire a monitoring occasion for performing the physical downlink control signaling monitoring in the predetermined time window; wherein the monitoring occasion determines a time resource within the predetermined time window for monitoring a physical downlink control signaling;

wherein the one or more transmission units in which the physical downlink control signaling monitoring needs to be performed in the predetermined time window correspond to monitoring parameter information, and the monitoring parameter information comprises at least one of following information: a monitoring number, a control signaling format to be monitored or an aggregation level.

\* \* \* \* \*